Feb. 2, 1960          H. T. SEALE          2,923,576
PRESSURE LINE SHUT-OFF VALVE
Filed April 4, 1955
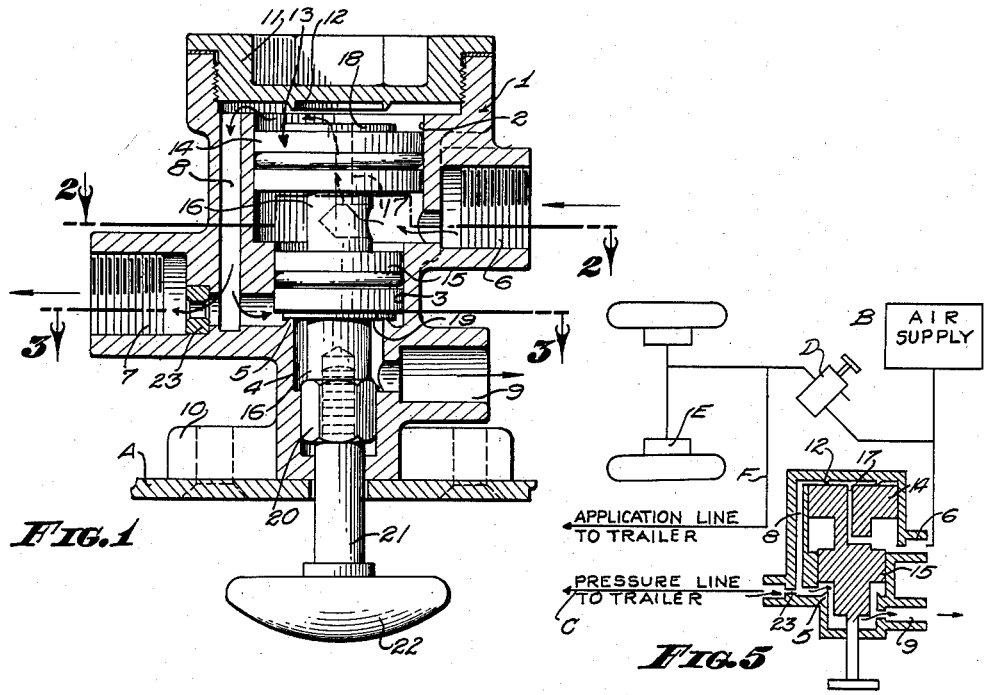
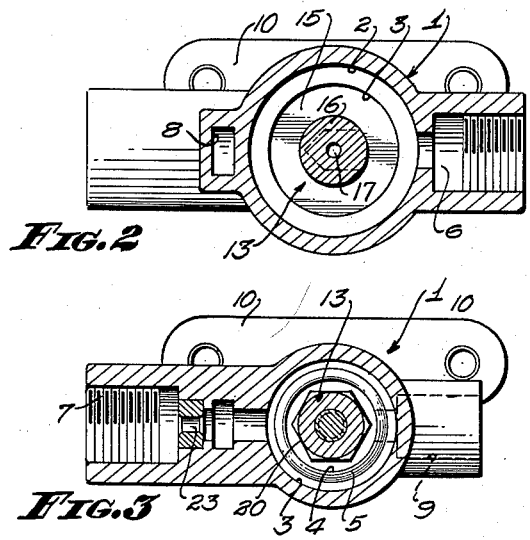
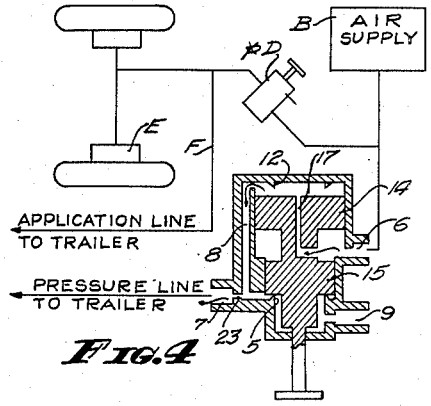
INVENTOR.
HOMER T. SEALE
BY
Lyon & Lyon
ATTORNEYS United States Patent Office 2,923,576
Patented Feb. 2, 1960

2,923,576
PRESSURE LINE SHUT-OFF VALVE
Homer T. Seale, Los Angeles, Calif.
Application April 4, 1955, Serial No. 498,871
10 Claims. (Cl. 303—30)

My invention relates to pressure line shut-off valves, that is, to shut-off valves adapted to close the upstream side of a pressure line should pressure in the down stream side drop below a safe minimum, and included in the objects of my invention are:

First, to provide a shut-off valve which is particularly adapted for use in, but not limited to, tractor-trailer air-brake systems, and which may be incorporated in the trailer line control apparatus disclosed in my previous Patent Number 2,700,435, issued January 25, 1955.

Second, to provide a shut-off valve which may be so installed in a trailer line control system that, in the event of either accidental or intentional break in the pressure line between a tractor unit and trailer unit, air supply is automatically shut off so as to prevent loss of air pressure in the tractor unit.

Third, to provide a shut-off valve of this type which, when caused to shut off a pressure line must thereafter be manually reopened.

Fourth, to provide a shut-off valve of this type which is arranged for manual as well as automatic operation, whereby the pressure line controlled thereby may be opened or closed at the will of the operator.

Fifth, to provide a shut-off valve of this type which permits the normal fluctuations of pressure in the pressure line occasioned by use of the braking system of the tractor and trailer so as not to interfere in any manner with the supply of air to the trailer unit or storage of air for brake-application purposes.

Sixth, to provide a valve of this type which is not only particularly dependable in operation but also economical of manufacture, and easily installed and serviced.

With the above and other objects in view, as may appear hereinafter, reference is directed to the accompanying drawings in which:

Figure 1 is a longitudinal sectional view through my pressure line shut-off valve with the valve shown in its operating position;

Fig. 2 is a transverse sectional view through 2—2 of Fig. 1;

Fig. 3 is a transverse sectional view through 3—3 of Fig. 1;

Fig. 4 is a diagrammatical view of the pressure shut-off valve, as employed in the air-brake pressure line between a tractor and a trailer, showing the manner of its installation in an air-brake system with the valve shown in its open position; and Fig. 5 is a similar diagrammatical view, showing the valve in its closed position.

My trailer line shut-off valve includes a valve body 1 having a longitudinal bore therethrough which defines a major chamber 2 at one end of the valve body, an intermediate minor chamber 3, and an exhaust chamber 4. A valve seat 5 is formed by the shoulder between the minor chamber 3 and the exhaust chamber 4. An inlet port 6 intersects the side of the major chamber 2. An outlet port 7 communicates with the minor chamber 3 and with a passage 8, leading to the end of the valve body 1 in which is formed the major chamber 2.

The exhaust chamber 4 is intersected by an exhaust port 9. The end of the valve body 1 having the exhaust chamber 4 is provided with laterally directed mounting feet 10 so that the valve may be secured to the back side of a panel A.

The end of the valve body 1 having the major chamber 2 is further enlarged and internally screw threaded to receive a cap 11 which closes the major chamber 2, but clears the major chamber sufficiently to provide communication between the major chamber 2 and the passage 8. The cap 11 is provided with an annular raised seat 12 which confronts the major chamber 2 and is equal in diameter to the valve seat 5.

The bore of the valve body 1 receives a valve plunger 13 which includes a major piston 14 fitting the major chamber 2 and a minor piston 15 which fits the minor chamber 3. The valve plunger further includes a stem 16 which connects the pistons 14 and 15 and extends into the exhaust chamber 4. A passage 17 extends downwardly through the major piston 14 and communicates with the region between the two pistons.

The upper side of the major piston 14 is provided with a valve seat 18 which engages the valve seat 12. The lower side of the minor piston 15 is provided with a valve seat 19 which engages the valve seat 5.

The lower end of the stem 16 terminates in a polygonal end portion 20 and is adapted to move in a similarly shaped portion of the valve body bore below the exhaust chamber 4. A rod 21 is adapted to extend through the adjacent end of the valve body and screw thread into the polygonal end of the stem 16. The outer end of the rod projects through the panel A and is provided with a knob 22.

Interposed between the outlet port 7 and the passage 8 is an orifice disc 23.

Operation of my shut-off valve when employed as a trailer line control valve is as follows:

The shut-off valve is mounted on the dashboard of the tractor or otherwise located in a position accessible to the driver. The inlet port 6 is connected to the air supply B of the tractor and trailer, as shown in the diagrammatical views, Figs. 4 and 5.

The outlet port 7 is connected to the pressure line C which leads to the trailer. The air supply line B also communicates with a foot-operated air valve D which controls the brakes E of the tractor and is connected through an application line F to the brakes of the trailer.

When the tractor and trailer are connected and the brakes are in operation, the trailer line control valve occupies the position shown in Figs. 1 and 4. In this position the inlet port 6 is connected to the outlet port 7 throught he major chamber 2 between the two pistons 14 and 15, passage 17, passage 8, and orifice disc 23.

By reason of the passage 17 the pressure on opposite sides of the major piston 14 is equal and opposed; that is, there is no pressure differential across the piston 14 to urge it in either direction. However, the upper side of the piston 15 is subjected to the pressure existing in the inlet chamber between the pistons 14 and 15 and therefore holds the plunger 13 in its lower position, shown in Figs. 1 and 4.

Should the pressure in the pressure line C to the trailer drop below a predetermined value, the pressure above the major piston 14 is relieved so that sufficient pressure differential is established across the major piston 14 to raise the plunger 13 in opposition to the pressure on top of the piston 15 until the valve seat 18 of the major piston 14 closes against the valve seat 12. In doing so, any residual air pressure in the pressure line to the trailer exhausts through the minor chamber 3, exhaust chamber 4, and exhaust port 9, as shown in Fig. 5.

When the valve is in the position shown in Fig. 5, the plunger 13 may be moved to the position shown in Figs. 1 and 4 by manual pull on the knob 22. However, the valve will not stay in the position shown in Figs. 1 and 4 if the pressure line to the trailer is open to the atmosphere. If the pressure line to the trailer is in proper condition, the valve will stay in its position shown in Figs. 1 and 4, as soon as the air supply has built up the proper back pressure in the pressure line to the trailer so as to reestablish pressure on top of the piston 14.

In the normal use of the air brakes, particularly under conditions of frequent use, the pressure in the pressure line to the trailer may be permitted to drop a limited amount, and it is undesirable to have the pressure line control valve change from the position shown in Figs. 1 and 4 under such conditions.

The orifice disc 23 serves to establish a pressure differential between the region above the major piston 14 and the pressure line to the trailer, so that a lower pressure in the pressure line is required before the valve plunger 13 shifts its position than would otherwise be the case. By selection of the proper orifice, the desired conditions for operation of the valve may be obtained for the particular installation.

It will thus be observed that the shut-off valve automatically closes to prevent loss of air supply to the tractor in the event that the pressure line to the trailer should be broken, but by reason of the orifice disc 23 it may be arranged to function properly and permit a predetermined lowering of pressure in the pressure line to the trailer.

In the event that the pressure line is disconnected deliberately, as in the case of disconnecting the tractor from the trailer, the control valve also functions to prevent loss of air pressure in the braking system of the tractor so that the operation of the tractor air brakes are not affected. Upon reconnecting a trailer, it is merely necessary to manually reset the shut-off valve.

Having fully described my invention, it is to be understood that I do not wish to be limited to the details herein set forth, but my invention is of the full scope of the appended claims.

I claim:

1. A tractor-trailer air brake system comprising: a source of air pressure carried by the tractor; a pressure maintenance line connected to the trailer, a valve structure adapted for installataion in said pressure maintenance line, said valve structure including, a valve body structure defining in tandem a major chamber, a minor chamber, an exhaust chamber of diminishing area, an intake port communicating with one end of said major chamber adjacent said minor chamber and with said air source, an outlet port communicating with said minor chamber and with said pressure maintenance line, a passage from said minor chamber to the opposite end of said major chamber remote therefrom, and an exhaust port communicating with said exhaust chamber; a plunger having major and minor pistons in said major and minor chambers and having confronting sides of different area, said intake port being disposed between said pistons; a first and second valve means disposed respectively between the remote ends of said major and minor pistons and the corresponding ends of said major and minor chambers; means defining a passage bypassing said major piston and communicating with said outlet port through said first valve means; said second valve means controlling communication from said minor chamber to said exhaust chamber; said plunger being movable on drop of pressure at said outlet and in the region between the major portion and adjacent end of said major chamber to close said first valve means against flow from said inlet to said outlet, and to open said second valve means to permit flow from said outlet to said exhaust port; and a manually accessible handle for moving said plunger.

2. A control valve as set forth in claim 1, wherein: a restricted orifice is provided in said outlet to establish a predetermined pressure differential between the air pressure in the maintenance line, connected with said outlet, and the air pressure in the supply line, connected with said inlet, at which said first valve means closes and said second valve means opens.

3. A tractor-trailer air brake system comprising: a source of air pressure carried by the tractor; a pressure maintenance line connected to the trailer, a valve structure adapted for installation in said pressure maintenance line, said valve structure including, means defining an inlet chamber having a pair of movable walls of different area, said inlet chamber being connected with said source of air pressure; means connecting said walls for movement in unison; means defining with the larger of said walls a pressure chamber; means defining with the smaller of said walls an exhaust chamber; first and second valves in said pressure chamber and said exhaust chamber, said valves including movable valve elements carried by said movable walls; means defining a flow passage from said inlet to said first valve whereby said first valve controls flow from said inlet to said pressure chamber; said second valve controlling flow to said exhaust chamber; an outlet communicating with said pressure maintenance line and connected with both said pressure chamber and exhaust chamber; and a manually accessible handle for moving said movable walls to open and close said first and second valves.

4. A control valve as set forth in claim 3, wherein: a restricted orifice is provided in said outlet to establish a predetermined pressure differential between air pressure in said inlet chamber and the air pressure in said pressure maintenance line at which said first valve closes and said second valve opens.

5. A valve structure, comprising: means defining an outlet chamber, an inlet chamber, and an exhaust chamber, and including a major area movable wall between said inlet and outlet chambers, and a minor area movable wall between said inlet and said exhaust chambers; said major and minor area walls, having confronting surfaces exposed to said inlet chamber; an inlet port for said inlet chamber between said major and minor movable walls; an outlet port communicating with said outlet chamber; first and second valves including movable valve elements carried respectively by the remote surfaces of said major and minor movable walls; means defining a flow passage from said inlet chamber to said outlet chamber through said first valve; means defining a discharge passage from said outlet port through said inlet chamber to said exhaust chamber; said major and minor movable walls and the movable elements of said first and second valves being connected together for movement in unison whereby either of said valves is opened when the other of said valves is closed, the pressure areas of said walls being so proportioned that said first valve tends to remain open and said second valve tends to remain closed when the pressures at said inlet port and outlet port are substantially equal, and said first valve closes and said second valve opens upon drop in pressure at said outlet port; and manually accessible means for moving said major and minor walls and said movable valve elements.

6. A control valve as set forth in claim 5, wherein: a restricted orifice is provided in said outlet port to establish a predetermined pressure differential between inlet port and outlet port at which said first valve closes and said second valve opens.

7. In combination, a pressure line and a shut-off valve, comprising: means defining an inlet chamber having a pair of movable walls of different area, said inlet chamber being connected with the upstream side of said pressure line; means connecting said walls for movement in unison; means defining with the larger of said walls a pressure chamber; means defining with the smaller of said walls an exhaust chamber; first and second valves in said pressure chamber and said exhaust chamber, said valves including movable valve elements carried by said movable walls; means defining a flow passage from said inlet to said first valve whereby said first valve controls flow from said inlet to said pressure chamber; said second valve controlling flow to said exhaust chamber; means defining an outlet for connection to the downstream side of said pressure line and passages connecting said outlet with said pressure chamber and said exhaust chamber; the relative areas of said movable walls and said first and second valves being so proportioned as to cause said first valve to close and said second valve to open, upon pressure drop in the downstream side of said pressure line, thereby to close the upstream side of said pressure line and exhaust the downstream side of said pressure line; and a manually accessible handle for moving said movable walls to open and close said first and second valves.

8. A shut-off valve as set forth in claim 7, wherein: a restricted orifice is provided in said outlet to establish a predetermined pressure differential between fluid pressure in the upstream side of said pressure line and the fluid pressure in the downstream side of said pressure line at which said first valve closes and said second valve opens to effect a shut-off of the upstream side of said pressure line and exhaust of the downstream side thereof.

9. A shut-off valve, comprising: means defining an outlet chamber, an inlet chamber, and an exhaust chamber, and including a major area movable wall between said inlet and outlet chambers, and a minor area movable wall between said inlet and said exhaust chambers, said major and minor area movable walls forming opposite sides of said inlet chamber; first and second valves in said outlet chamber and exhaust chamber respectively, including movable valve elements carried respectively by the remote sides of said major and minor movable walls exposed to said outlet and exhaust chambers; means defining a flow passage from said inlet chamber to said outlet chamber through said first valve; said second valve forming a discharge means to said exhaust chamber; an inlet port in said inlet chamber disposed between said major and minor movable walls; an outlet port communicating with said outlet chamber and said exhaust chamber; said major and minor movable walls and the movable elements of said first and second valves being connected together for movement in unison, the pressure areas of said walls being so proportioned that said first valve tends to remain open and said second valve tends to remain closed when the pressures at said inlet port and outlet port are substantially equal, and said first valve closes and said second valve opens upon drop in pressure at said outlet port; and manually accessible means for moving said major and minor walls and said movable valve elements.

10. A control valve as set forth in claim 9, wherein: a restricted orifice is provided in said outlet port to establish a predetermined pressure differential between said inlet port and outlet port at which said first valve closes and said second valve opens.

References Cited in the file of this patent

UNITED STATES PATENTS

| 1,478,669 | Mattingly | Dec. 25, 1923 |
| 1,485,958 | Bridgham | Mar. 4, 1924 |
| 1,563,143 | Bailie | Nov. 24, 1925 |
| 2,238,124 | Mathieson | Apr. 25, 1941 |
| 2,445,544 | Trautman | July 20, 1948 |
| 2,638,108 | Williams | May 12, 1953 |

FOREIGN PATENTS

| 635,751 | Great Britain | Apr. 19, 1950 |